(12) United States Patent
Dai et al.

(10) Patent No.: US 11,836,954 B2
(45) Date of Patent: Dec. 5, 2023

(54) 3D POINT CLOUD COMPRESSION SYSTEM BASED ON MULTI-SCALE STRUCTURED DICTIONARY LEARNING

(71) Applicant: SHANGHAI JIAO TONG UNIVERSITY, Shanghai (CN)

(72) Inventors: Wenrui Dai, Shanghai (CN); Yangmei Shen, Shanghai (CN); Chenglin Li, Shanghai (CN); Junni Zou, Shanghai (CN); Hongkai Xiong, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 18/182,401

(22) Filed: Mar. 13, 2023

(65) Prior Publication Data
US 2023/0215055 A1     Jul. 6, 2023

Related U.S. Application Data

(63) Continuation of application No. PCT/CN2021/119045, filed on Sep. 17, 2021.

(30) Foreign Application Priority Data

Sep. 22, 2020  (CN) .......................... 202011002405.0

(51) Int. Cl.
*G06T 9/00*  (2006.01)
*G06T 9/40*  (2006.01)

(52) U.S. Cl.
CPC ................ *G06T 9/001* (2013.01); *G06T 9/40* (2013.01)

(58) Field of Classification Search
CPC .................................. G06T 9/001; G06T 9/40
See application file for complete search history.

(56) References Cited

U.S. PATENT DOCUMENTS

| 10,871,536 | B2 | 12/2020 | Golden et al. | |
| 11,562,181 | B2 | 1/2023 | Chen et al. | |
| 2006/0136402 | A1* | 6/2006 | Lee | G06F 16/2465 |
| 2017/0347100 | A1 | 11/2017 | Chou et al. | |

FOREIGN PATENT DOCUMENTS

| CN | 103886625 | A |   | 6/2014 | |
| CN | 104199627 | A |   | 12/2014 | |
| CN | 104268934 | A |   | 1/2015 | |
| CN | 110278444 | A |   | 9/2019 | |
| CN | 110400300 | A |   | 11/2019 | |
| CN | 110996098 | A |   | 4/2020 | |
| CN | 111133476 | A |   | 5/2020 | |
| CN | 111145090 | A |   | 5/2020 | |
| CN | 111684808 | A |   | 9/2020 | |
| CN | 112184840 | B | * | 9/2022 | ............ G06T 9/007 |
| WO | 2020012187 | A1 |   | 1/2020 | |

OTHER PUBLICATIONS

Y. Shen, W. Dai, C. Li, J. Zou and H. Xiong, "Multi-Scale Structured Dictionary Learning for 3-D Point Cloud Attribute Compression," in IEEE Transactions on Circuits and Systems for Video Technology, vol. 31, No. 7, pp. 2792-2807, Jul. 2021, doi: 10.1109/TCSVT.2020.3026046. (Year: 2020).*
J. Mairal, "Sparse modeling for image and vision processing", Found. Trends Comput. Graph. Vis., vol. 8, No. 2, pp. 85-283, 2014 (Year: 2014).*

* cited by examiner

*Primary Examiner* — Charles T Shedrick
(74) *Attorney, Agent, or Firm* — True Shepherd LLC; Andrew C. Cheng

(57) ABSTRACT

In a 3D point cloud compression system based on multi-scale structured dictionary learning, a point cloud data partition module outputs a voxel set and a set of blocks of voxels of different scales. A geometric information encoding module outputs an encoded geometric information bit stream. A geometric information decoding module outputs decoded geometric information. An attribute signal encoding module outputs a sparse coding coefficient matrix and a learned multi-scale structured dictionary. An attribute signal compression module outputs a compressed attribute signal bit stream. An attribute signal decoding module outputs decoded attribute signals. A 3D point cloud reconstruction module completes reconstruction. The system is applicable to lossless geometric and lossy attribute compression of point cloud signals. Based on the natural hierarchical partitioning structure of point cloud signals, the system gradually improves the reconstruction quality of high-frequency details in the signals from coarse scale to fine scale, and achieves significant gains.

16 Claims, 3 Drawing Sheets

3D POINT CLOUD COMPRESSION SYSTEM BASED ON MULTI-SCALE STRUCTURED DICTIONARY LEARNING

CROSS-REFERENCE TO RELATED APPLICATIONS

This application is a continuation of International Patent Application No. PCT/CN2021/119045 with a filing date of Sep. 17, 2021, designating the United States, now pending, and further claims priority to Chinese Patent Application No. 202011002405.0 with a filing date of Sep. 20, 2020. The content of the aforementioned applications, including any intervening amendments thereto, are incorporated herein by reference.

TECHNICAL FIELD

The present disclosure relates to a scheme in the technical field of three-dimensional (3D) point cloud data compression, and in particular to a 3D point cloud compression system based on multi-scale structured dictionary learning.

BACKGROUND ART

In recent years, with the rapid development of 3D data acquisition devices and display systems, and with the powerful GPU computing capabilities, real-world scenes and objects have been digitized into high-precision 3D point data in real-time. 3D data and technology have been widely used in many emerging areas, including virtual/augmented reality, mixed reality, telepresence, panoramic communication, autonomous driving, and robot navigation. 3D modeling technologies are various. For example, RGB-D frames and multi-view video technologies containing depth information can model 3D scenes and objects but do not support real-time rendering. Polygonal grids can reconstruct 3D surfaces of objects using connectivity between vertices but cannot model 3D data that does not satisfy manifold topology. Among many technologies, 3D point clouds come out. A 3D point cloud represents a 3D object with a series of points, and each point is composed of its corresponding geometric coordinate position information and attribute signals like color, texture, reflectivity, etc. The 3D point cloud can flexibly represent the structure of the original data without the limitation of manifold topology, and can effectively support real-time information processing. However, each point cloud often contains hundreds of thousands or even millions of 3D points. How to effectively compress, store and transmit such massive data, especially for the emerging industries with strict real-time requirements such as automatic driving, is an important problem to be solved urgently.

Through the literature search of the prior art, it is found that C. Zhang, D. Florencio and C. Loop, in the article "Point Cloud Attribute Compression with Graph Transform" published at the 2014 IEEE International Conference on Image Processing (ICIP2014) conference, creatively proposed to use the graph Fourier transform to remove the correlations of blocks of voxelized point cloud signals, i.e., construct the nearest neighbor graph for blocks of voxels in the point cloud, and calculate a graph Laplacian matrix which is used as the transform basis matrix to encode the point cloud signals. However, graph Fourier transform requires eigenvalue decomposition of the large-scale Laplacian matrix, resulting in high computational complexity which is not suitable for real-time applications. In order to reduce the complexity, R. L. de Queiroz and P. A. Chou proposed an improved Haar wavelet transform in the paper "Compression of 3D Point Clouds Using a Region-Adaptive Hierarchical Transform" published in the journal of IEEE Transactions on Image Processing in 2016 (TIP 2016). The transform was to perform an adaptive weighted transform on the point cloud signals with irregular spatial distribution, and therefore avoided the eigenvalue decomposition of large-scale matrix and significantly improved the encoding efficiency. However, the graph Fourier transform and the adaptive wavelet transform are both fixed analytic transforms, and their transform basis matrices are directly calculated from the geometric information, lacking the adaptability to attribute signals, so it is difficult to effectively characterize the complex structural characteristics of 3D point cloud data in natural scenes.

In the same period, since 2017, the MPEG 3DG PCC standardization organization has collected proposals for 3D point cloud compression technology, and selected a hybrid point cloud encoding technology as a test benchmark. This technology compresses geometric information using an octree structure, and compresses attribute signals of 3D-2D projections using an image JPEG encoder. Finally, after layer-by-layer screening and strict comparison, MPEG developed two standard test models. One is the technology of Video-based Point Cloud Compression (V-PCC) standards, which projects a 3D point cloud into a 2D plane to obtain geometric video sequences and attribute video sequences which are then compressed using the existing HEVC video encoding standards. The other is the technology of Geometric-based Point Cloud Compression (G-PCC) standards, which directly compresses point cloud data in the 3D space using the octree structure and spatial transform coding with critical sampling. However, the 3D-2D projection of V-PCC will inevitably introduce projection distortion, and the spatial transformation of attribute in G-PCC only depends on geometric information and does not consider the statistical characteristics of the attribute signals, resulting in a degraded compression quality of the attribute signal.

SUMMARY OF THE INVENTION

The present disclosure aims to overcome the above-mentioned defects in the prior art, and provides a 3D point cloud compression system based on multi-scale structured dictionary learning. Based on the natural hierarchical partitioning structure of point cloud signals, the system gradually improves the reconstruction quality of high-frequency details in the signals from the coarse scale to the fine scale, and achieves significant gains in the compression performance as compared with the international standards MPEG 3DG G-PCC and V-PCC.

The present disclosure is implemented according to the following technical schemes.

A 3D point cloud compression system based on multi-scale structured dictionary learning is provided. The method includes a point cloud data partition module, a geometric information encoding module, a geometric information decoding module, an attribute signal encoding module, an attribute signal compression module, an attribute signal decoding module, and a 3D point cloud reconstruction module.

The point cloud data partition module is configured to partition original point cloud data into a voxel set with uniform spatial distribution and further partition the voxel set into blocks of point cloud voxels of different scales, transmit the obtained voxel set to the geometric information encoding module, transmit the blocks of point cloud voxels to the attribute signal encoding module, and form a training set and a test set using the blocks of point cloud voxels.

The geometric information encoding module is configured to perform lossless encoding on geometric information of a point cloud voxel according to an octree structure, and transmit an encoded bit stream to the geometric information decoding module.

The geometric information decoding module is configured to decode the encoded bit stream to obtain decoded geometric information, and transmit the decoded geometric information to the attribute signal encoding module and the 3D point cloud reconstruction module.

The attribute signal encoding module is configured to learn a multi-scale structured dictionary from the blocks of point cloud voxels in the training set, perform hierarchical sparse coding on the blocks of point cloud voxels in the test set based on the multi-scale structured dictionary, transmit the multi-scale structured dictionary to the attribute signal compression module and the attribute signal decoding module, and transmit sparse coefficients of the hierarchical sparse coding to the attribute signal compression module.

The attribute signal compression module is configured to perform rearrangement, quantization, prediction and entropy encoding on the sparse coefficients, and transmit an encoded bit stream to the attribute signal decoding module.

The attribute signal decoding module is configured to perform entropy decoding, inverse prediction and dequantization to obtain a decoded sparse coefficient matrix, reconstruct point cloud attribute signals according to the multi-scale structured dictionary, and transmit the reconstructed attribute signals to the 3D point cloud reconstruction module.

The 3D point cloud reconstruction module is configured to integrate the geometric information obtained by the geometric information decoding module and the attribute signals obtained by the attribute signal decoding module to obtain a reconstructed 3D point cloud.

Preferably, the point cloud data partition module includes a voxel partition submodule and a block partition submodule. The voxel partition submodule is configured to recursively partition a bounding cube where the original unorganized point cloud data is located into spatial coordinate systems-aligned and uniformly distributed voxels, and transmit a voxel set obtained by voxel partition to the geometric information encoding module and the block partition submodule. The block partition submodule is configured to uniformly partition the voxel set into blocks of voxels of different scales, and transmit a set of blocks of voxels to the attribute signal encoding module.

Furthermore, the voxel partition submodule is configured to recursively partition the bounding cube of the point cloud into voxel units according to an octree structure, where each node of the octree containing point cloud point data is represented as a voxel unit, floating-point coordinates of points contained in each voxel are quantized into integer coordinates of a voxel center, and an average value of attribute information of the contained points is taken as an attribute signal of the voxel unit.

Furthermore, the block partition submodule is configured to, according to a preset number of scales K, uniformly partition a set of N×N×N voxel units into blocks of voxels with a scale of m×m×m (m<N), and further decrease the scale layer by layer to partition the set of voxel units into blocks of voxels with a scale of $$\frac{m}{2^{k-1}} \times \frac{m}{2^{k-1}} \times \frac{m}{2^{k-1}},$$

k=1, ..., K, all the obtained blocks of voxels constituting a set of multi-scale blocks of voxels.

Preferably, the geometric information encoding module is configured to allocate an eight-bit byte to each branch node in the octree structure of voxel partition to indicate whether point data exists in a spatial unit corresponding to child nodes of the branch node, traverse the octree structure in a depth-breadth first order to form an encoded codeword of the geometric information composed of all the obtained bytes, further compress the information using entropy encoding to obtain an encoded bit stream of geometric information, and transmit the encoded bit stream of geometric information to the geometric information decoding module.

Preferably, the geometric information decoding module is configured to perform entropy decoding on the encoded bit stream of geometric information to obtain the octree structure for encoding and the byte of each branch node, obtain geometric coordinate information of each voxel unit, and transmit the decoded geometric coordinate information to the attribute signal encoding module and the 3D point cloud reconstruction module.

Preferably, the attribute signal encoding module includes a multi-scale dictionary learning submodule and a hierarchical sparse coding submodule. The multi-scale dictionary learning submodule is configured to introduce a weight matrix to depict dimensional irregularity of the attribute signals of the blocks of voxels of different scales in the training set, and adaptively learn a multi-scale structured dictionary using an alternative optimization algorithm. The hierarchical sparse coding submodule is configured to perform transform encoding on the attribute signals of the multi-scale blocks of voxels in the test set based on hierarchical sparsity of point cloud signals according to the learned multi-scale structured dictionary, and transmit sparse coefficients to the attribute signal compression module.

Furthermore, the multi-scale dictionary learning submodule is configured to introduce a non-uniform weight matrix to depict dimensional irregularity of the attribute signals of the blocks of voxels, establish a minimization problem in which an optimization objective function is non-uniformly weighted mixed $\ell_1/\ell_2$ norm regularization, and alternately update dictionary atoms and sparse coefficients using Gauss-Seidel iterations to improve convergence speed of learning without enlarging an approximation error, where the learned dictionary atoms are naturally arranged in a tree structure, and as the scale of the atoms decreases from coarse to fine layer by layer, a signal frequency characterized by the atoms increases step by step.

Furthermore, the hierarchical sparse coding submodule is configured to design regularization terms of hierarchical sparsity constraints based on natural hierarchical structured priors of point cloud signals, and perform effective sparse coding on the attribute signals of the blocks of voxels in the test set based on the multi-scale structured dictionary using the alternating direction method of multipliers, so as to gradually improve the representation accuracy of high-frequency details in the signal while ensuring the encoding efficiency.

Preferably, the attribute signal compression module includes: a sparse coefficient rearrangement submodule, a uniform quantization submodule, a differential encoding prediction submodule, and an adaptive arithmetic entropy encoding submodule. The sparse coefficient rearrangement submodule is configured to rearrange the sparse coefficient matrix to improve a compression ratio of subsequent encoding, and transmit rearranged sparse coefficients to the uniform quantization submodule. The uniform quantization submodule is configured to quantize the values of the sparse coefficients, and the differential encoding prediction submodule is configured to perform differential encoding on indices of the sparse coefficients. The adaptive arithmetic entropy encoding submodule is configured to perform entropy encoding on the quantized sparse coefficients and the predicted indices, and transmit the compressed bit stream to the attribute signal decoding module.

Furthermore, the sparse coefficient rearrangement submodule is configured to rearrange row vectors of the sparse coefficient matrix according to a descending order of the number of non-zero elements, and accordingly rearrange column atom vectors of the multi-scale dictionary, so as to reduce the entropy of the indices for subsequent differential encoding with the reconstructed signals unchanged.

Furthermore, the uniform quantization submodule is configured to use a dead-zone uniform quantizer to set a zero interval with a size twice of those of other uniform quantization intervals, so as to eliminate insignificant sparse coefficients with less information, thereby significantly improving compression efficiency.

Furthermore, the differential encoding prediction submodule is configured to perform differential encoding on the indices of the sparse coefficient matrix by columns, and mark the end of each column as zero, thereby further reducing information redundancy.

Furthermore, the adaptive arithmetic entropy encoding submodule is configured to perform effective entropy encoding on the quantized non-zero coefficients and differential prediction residual of the indices to obtain a complete compressed bit stream of the point cloud attribute signals.

Preferably, the attribute signal decoding module includes: an adaptive arithmetic entropy decoding submodule, a differential decoding prediction submodule, a dequantization submodule and an attribute signal reconstruction submodule. The adaptive arithmetic entropy decoding submodule is configured to perform entropy decoding on the compressed bit stream to obtain decompressed sparse coefficients and differential prediction residual of the indices, and transmit the sparse coefficients and the differential prediction residual of the indices to the differential decoding prediction submodule. The differential decoding prediction submodule is configured to decode the residual of the indices to obtain the indices of the sparse coefficients, and transmit the indices to the dequantization submodule. The dequantization submodule is configured to dequantize the decompressed sparse coefficients to restore the values of the sparse coefficients, combine the sparse coefficients with the indices of the sparse coefficients to obtain a complete sparse coefficient matrix, and transmit the sparse coefficient matrix to the attribute signal reconstruction submodule. The attribute signal reconstruction submodule is configured to multiply the obtained reconstructed sparse coefficient matrix and the multi-scale dictionary to obtain reconstructed point cloud attribute signals, and transmit the point cloud attribute signals to the 3D point cloud reconstruction module.

Preferably, the 3D point cloud reconstruction module is configured to synthesize complete point data from the decoded geometric information and attribute signals, and obtain the final reconstructed 3D point cloud data.

Compared to the prior art, the present disclosure has at least one of the following advantageous effects.

The system of the present disclosure effectively improves the compression efficiency of 3D point cloud attribute signals, and the proposed multi-scale structured dictionary model can adaptively depict the spatial irregularity of structures in point clouds and gradually improve the approximation accuracy of high frequency information of signals.

The designed alternating optimization algorithm of the system of the present disclosure can reduce the complexity of traditional computation and improve the convergence speed of dictionary learning while ensuring the approximate optimal solution.

The compression framework of the system of the present disclosure enables customized quantization, prediction and entropy encoding on hierarchical sparse coding coefficients to further improve the performance of compression.

Compared with the analytic transform based on the graph Fourier transform or regional adaptive wavelets, the system of the present disclosure is adaptive in data training, so that the reconstruction quality can be effectively improved. Compared with the MPEG PCC international standards, the system does not require 3D-2D planar projection, avoiding the introduction of projection distortion, and it does not rely solely on the geometric information to construct attribute transformation basis, but also effectively uses the statistical characteristics and structured prior information of the attribute signals to learn the atoms of the multi-scale dictionary. Therefore, significant performance gains can be achieved.

BRIEF DESCRIPTION OF THE DRAWINGS

Other features, objects and advantages of the disclosure will become more apparent by reading the detailed description of non-limiting embodiments with reference to the following drawings.

DETAILED DESCRIPTION OF PREFERRED EMBODIMENTS

The present disclosure will be described in detail below with reference to specific embodiments. The following embodiments will help those skilled in the art to further understand the present disclosure, but will not limit the present disclosure in any way. It should be noted that for those skilled in the art, several variations and modifications can be made without departing from the concept of the present disclosure. These are all within the scope of protection of the present disclosure.

Figure 1:
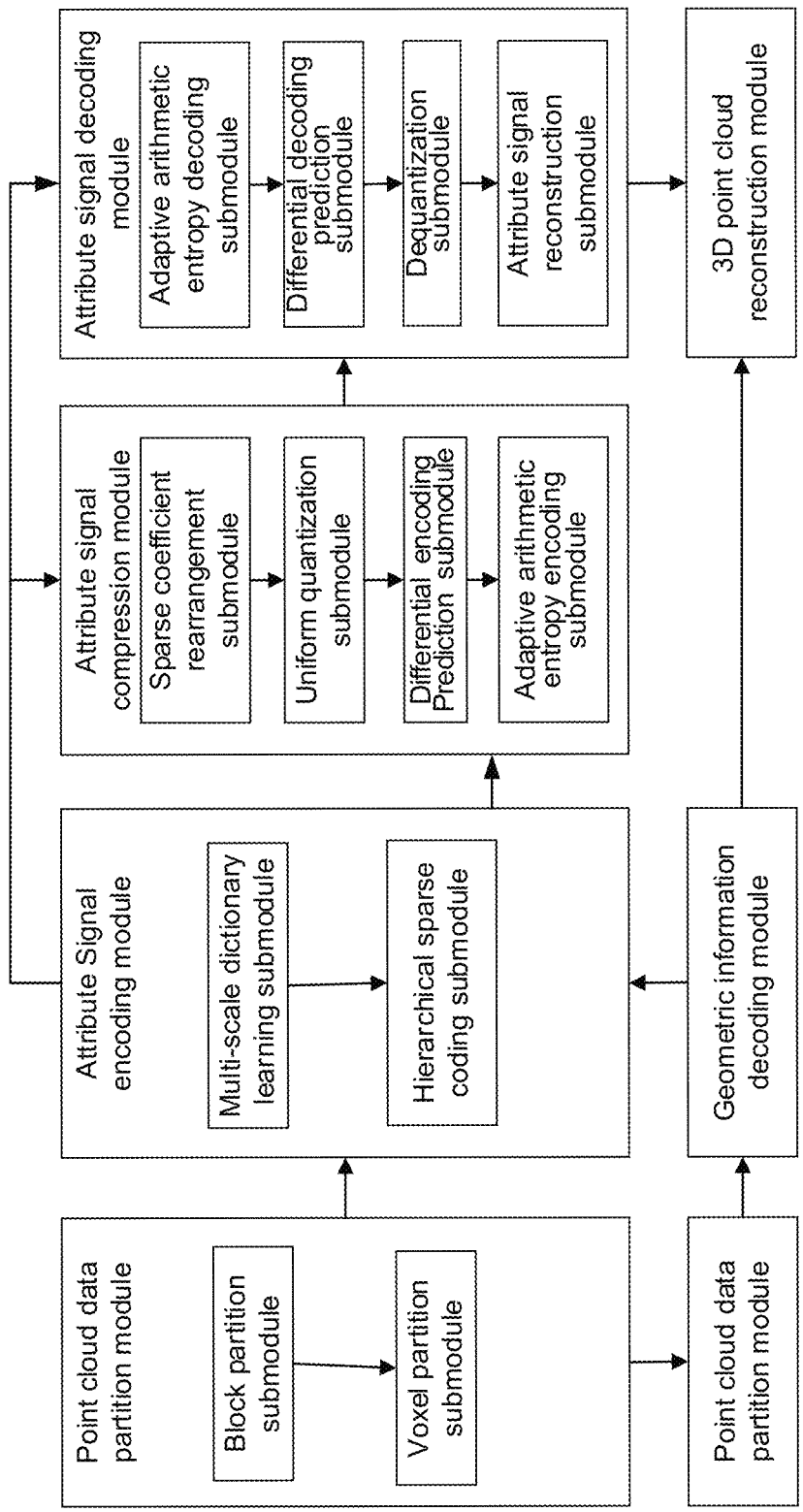
FIG. 1 is a structure block diagram of a preferred embodiment of the present disclosure.

FIG. 1 shows a structure block diagram of an embodiment of a 3D point cloud compression system based on multi-scale structured dictionary learning according to the present disclosure. In the embodiment, the system includes: a point cloud data partition module, a geometric information encoding module, a geometric information decoding module, an attribute signal encoding module, an attribute signal compression module, an attribute signal decoding module, and a 3D point cloud reconstruction module. The point cloud data partition module is connected to the geometric information encoding module to transmit a voxel set obtained by point cloud division. The point cloud data partition module is connected to the attribute signal encoding module to transmit a set of blocks of voxels of different scales obtained by division. The geometric information encoding module is connected to the geometric information decoding module to transmit an encoded bit stream of geometric information. The geometric information decoding module is connected to the attribute signal encoding module to transmit decoded geometric information. The geometric information decoding module is connected to the 3D point cloud reconstruction module to transmit decoded geometric information. The attribute signal encoding module is connected to the attribute signal compression module to transmit a sparse coefficient matrix and a learned multi-scale structured dictionary. The attribute signal encoding module is connected to the attribute signal decoding module to transmit the learned multi-scale structured dictionary. The attribute signal compression module is connected to the attribute signal decoding module to transmit a compressed bit stream of attribute signals. The attribute signal decoding module is connected to the 3D point cloud reconstruction module to transmit decoded attribute signals. The 3D point cloud reconstruction module outputs the finally reconstructed point cloud data.

The embodiment of the present disclosure described above effectively improves the compression efficiency of 3D point cloud attribute signals, and the proposed multi-scale structured dictionary can adaptively depict the spatial irregularity of point cloud structure and gradually improve the approximation accuracy of high frequency information of signals.

Figure 2:
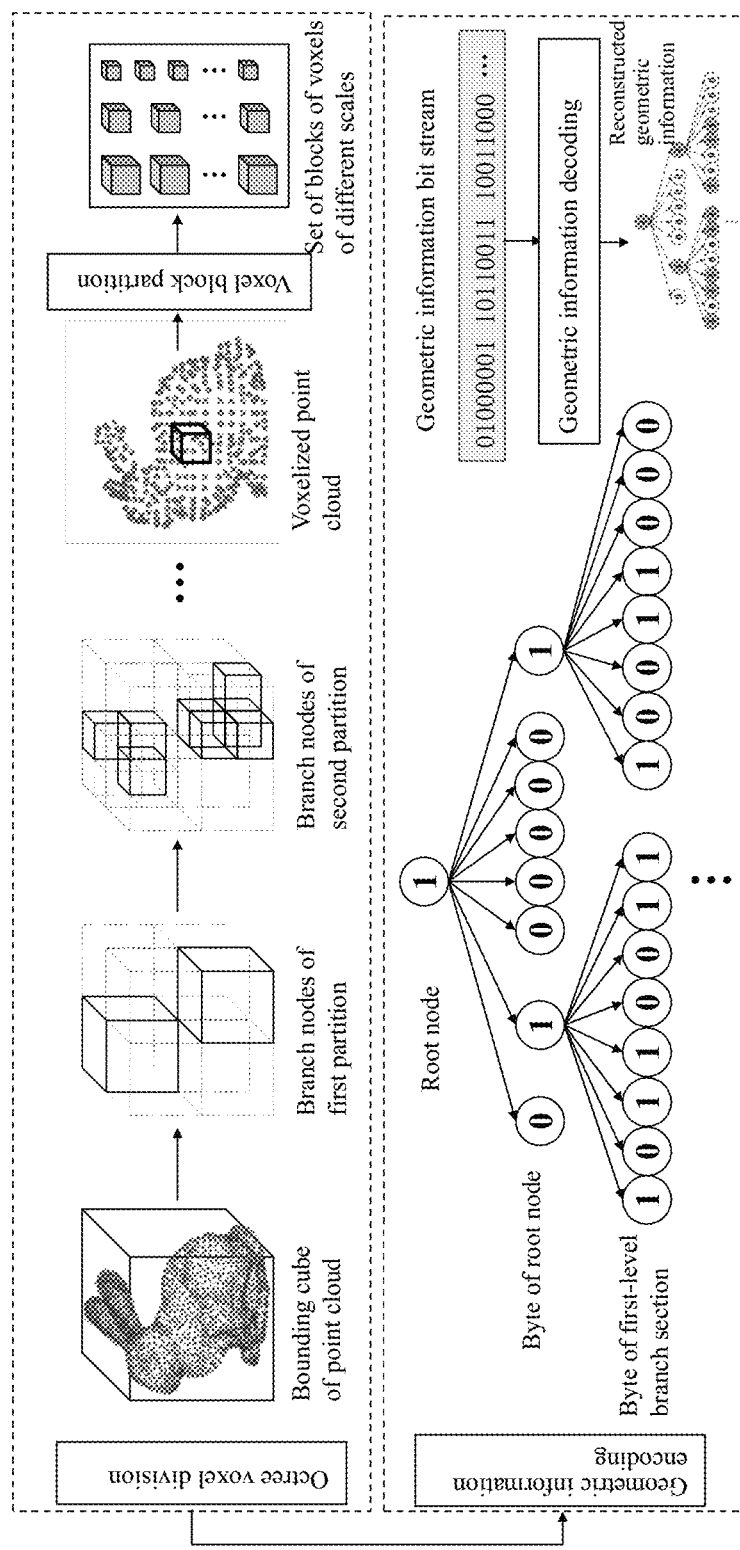
FIG. 2 is a schematic diagram of a point cloud data division module of an embodiment of the present disclosure.

FIG. 2 shows a schematic diagram of a point cloud data partition module in a preferred embodiment. The point cloud data partition module includes: a voxel partition submodule and a block partition submodule. The voxel partition submodule is connected to the geometric information encoding module to transmit a voxel set obtained by point cloud division. The voxel partition submodule is connected to the block partition submodule to transmit the voxel set obtained by point cloud division. The block partition submodule is connected to the attribute signal encoding module to transmit a set of blocks of voxels of different scales obtained by partition.

In a specific embodiment, the voxel partition submodule is configured to recursively partition a bounding cube of the point cloud into voxel units according to an octree structure, and each node of the octree containing point cloud point data is represented as a voxel unit. Floating-point precision coordinates of points contained in each voxel unit are quantized into integer coordinates of a voxel center, and an average value of attribute information of the contained points is taken as an attribute signal of the voxel unit. Generally, the number of layers of the octree, namely, the number of partitions, is set as 9 and 10, and the voxel resolutions N×N×N of corresponding point cloud geometric information are 512×512×512 and 1024×1024×1024. Of course, in other embodiments, other numbers of partitions and voxel resolutions may be selected, and the present disclosure is not limited to the parameters described above.

The block partition submodule is configured to, according to a preset number of scales K, uniformly partition the set of N×N×N voxel units into blocks of voxels with a scale of m×m×m (m<N), and further decrease the scale layer by layer to partition the set of voxel units into blocks of voxels with a scale of k=1, ..., K. All the obtained blocks of voxels constitute a set of multi-scale blocks of voxels.

As shown in FIG. 2, as a preferred embodiment, in the geometric information encoding module and the geometric information decoding module: the geometric information encoding module is connected to the geometric information decoding module to transmit an encoded bit stream of geometric information; the geometric information decoding module is connected to the attribute signal encoding module to transmit decoded geometric information; and the geometric information decoding module is connected to the 3D point cloud reconstruction module to transmit decoded geometric information.

Specifically, the geometric information encoding module is configured to allocate an eight-bit byte for each branch node in the octree structure of voxel partition to indicate whether point cloud point data exists in a spatial unit corresponding to child nodes of the branch node, where 1 represents yes while 0 represents no. The octree structure is traversed in a depth-breadth first order to form an encoded codeword of geometric information composed of all the obtained bytes. The information is further compressed using entropy encoding to obtain an encoded bit stream of geometric information, and the encoded bit stream of geometric information is transmitted to the geometric information decoding module.

The geometric information decoding module is configured to perform entropy decoding on the encoded bit stream of geometric information to obtain the octree structure for encoding and the byte of each branch node, so as to obtain geometric coordinate information of each voxel unit, and transmit the decoded geometric coordinate information to the attribute signal encoding module and the 3D point cloud reconstruction module.

Figure 3:
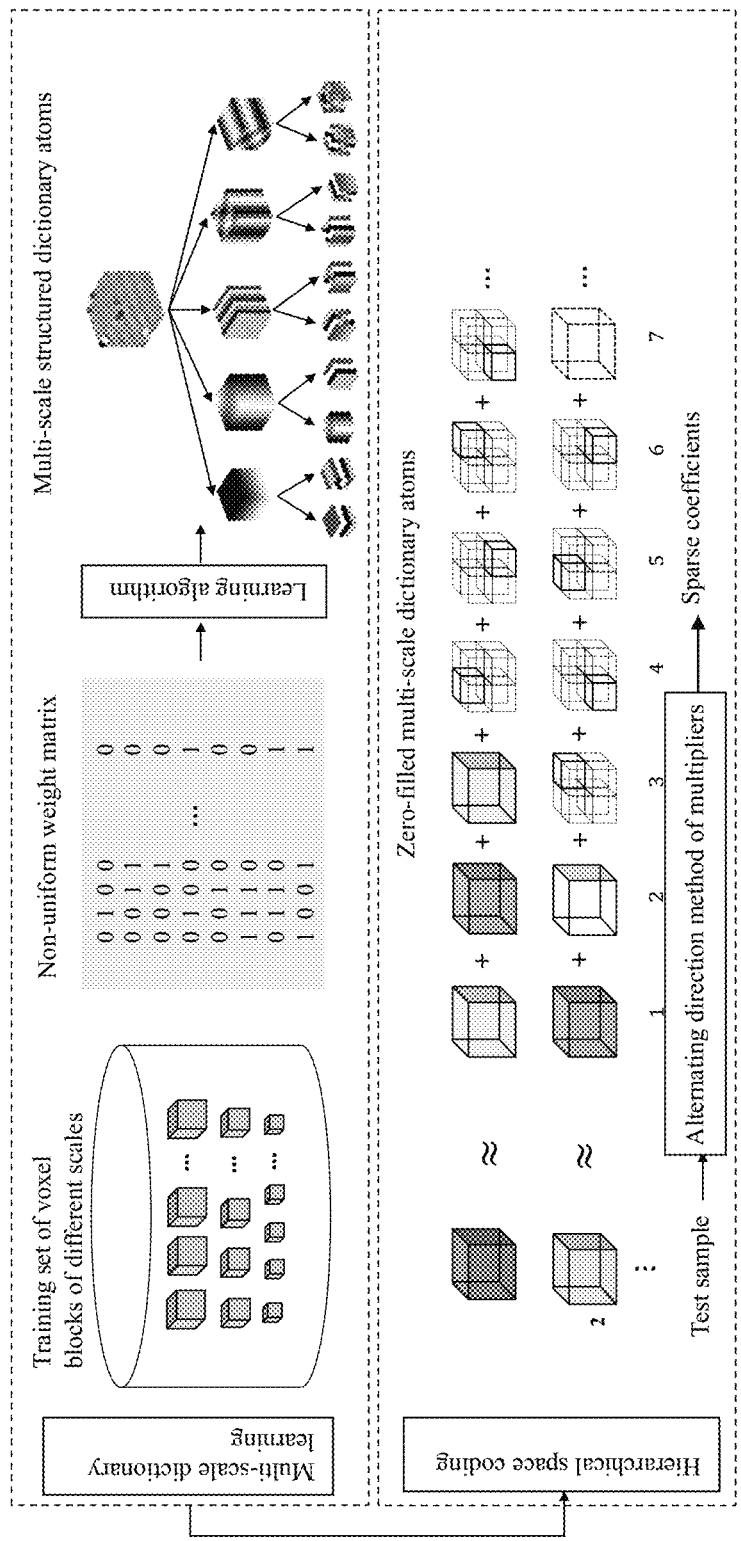
FIG. 3 is a schematic diagram of an attribute signal encoding module of an embodiment of the present disclosure.

As shown in FIG. 3, in a preferred embodiment, the attribute signal encoding module includes: a multi-scale dictionary learning submodule and a hierarchical sparse coding submodule. The multi-scale dictionary learning submodule is connected to the hierarchical sparse coding submodule to transmit a learned multi-scale structured dictionary, and the hierarchical sparse coding submodule is connected to the attribute signal compression module to transmit a sparse coefficient matrix.

Specifically, in a preferred embodiment, the multi-scale dictionary learning sub-module is configured to, for a training set $X=\{x_1, \ldots, x_n\}$ composed of blocks of voxels of different scales, introduce a non-uniform weight matrix M to depict the dimensional irregularity of the attribute signals of the blocks of voxels. The number of scales of the dictionary is set to be equal to the number of scales K of the signals, the initial multi-scale dictionary is set as $D=\{D^1, \ldots, D^K\}$ containing K sub-dictionaries of different scales, and the atoms of the initial dictionary are arranged in a tree structure in a descending order of the scales. By performing zero-filling for dictionary atoms of different scales, a corresponding dictionary matrix $D=[d_1, \ldots, d_p]$ is obtained, and a minimization problem is established in which the optimization objective function is non-uniformly weighted mixed $\ell_1/\ell_2$ norm $$\frac{m}{2^{k-1}} \times \frac{m}{2^{k-1}} \times \frac{m}{2^{k-1}},$$

$$\min_{D \in C, A \in \mathbb{R}^{p \times n}} \frac{1}{n} \sum_{i=1}^{n} \left\{ \frac{1}{2} \|M \circ (X - DA)\|_F^2 - \lambda \mathcal{H}(\alpha_i) \right\},$$

regularization: where D is a dictionary, A is a sparse coefficient matrix, $\alpha_i$ is a column vector of a signal $x_i$ on the dictionary D in the sparse coefficient matrix, $\lambda$ is a regularization parameter, and $\mathcal{C}$ is a matrix convex set that constrains the $\ell_2$ norm of the column vector of the dictionary to be not greater than 1. $\mathcal{H}(\alpha_i)=\Sigma_{g\in\mathcal{G}} w_g \|\alpha_g\|_2$ is the regularization term of hierarchical sparsity constraints, where $\mathcal{G}=\{g\}$ is a set of groups of dictionary atoms g, $w_g$ is a group weighting parameter, and $\alpha_g$ is a subvector of a sparse coefficient column $\alpha$ with group g as an index set. Since the objective problem is a non-convex function, the two variables are optimized alternately to obtain the approximate optimal solution. By using Gauss-Seidel iterations, the dictionary atom D and the sparse coefficient A are updated alternately to improve convergence speed of learning without enlarging the approximation error. Constrained by the regularization terms, the learned dictionary atoms are naturally arranged in a tree structure, and as the scale of the atoms decreases from coarse to fine layer by layer, the signal frequency characterized by the atoms increases.

Specifically, in a preferred embodiment, the hierarchical sparse coding module solve for the hierarchical sparse coefficients of the attribute signals. Since there is no interdependence between the sparse coefficients of the signals, parallel computation is available. For a test signal x, its objective problem for hierarchical $$D \text{ is}: \min_{\alpha\in\mathbb{R}^p} \frac{1}{2}\|M(x-D\alpha)\|_2^2 + \lambda\sum_{g\in\mathcal{G}} w_g\|\alpha_g\|_2.$$

sparse decomposition based on the multi-scale dictionary For each group g, local auxiliary variable $z_g$ and a corresponding equality constraint $z_g-\alpha_g=0$ are introduced, and the augmented Lagrange formulation $$L_\rho(\alpha, z, y) = \frac{1}{2}\|M(x-D\alpha)\|_2^2 + \lambda\sum_{g\in\mathcal{G}} w_g\|z_g\| + y^T(z-P\alpha) + \frac{\rho}{2}\|z-P\alpha\|_2^2$$

of the objective problem is further established, where y is a dual variable, p>0 is a penalty parameter, and P is a binary projection matrix. The alternating direction method of multipliers is used to alternately optimize the two original variables $\alpha$ and z, and then the dual variable y is subjected to gradient ascent, and the operations iterate until the algorithm converges. The optimal solution of z can be obtained with a grouping soft-thresholding operator, and the optimization of $\alpha$ is a convex quadratic programming problem, which can be directly solved by KKT optimal conditions. Since the exact solution of $\alpha$ involves matrix inversion, the computational complexity is too high for large-scale point cloud signals. In order to reduce the computational load, an approximate solution using the steepest gradient descent method or the preconditioned conjugate gradient method can be chosen.

The alternating optimization algorithm in the above-mentioned preferred embodiment of the present disclosure can reduce the complexity of conventional computation and improve the convergence speed of dictionary learning without enlarging an approximate optimal solution.

As shown in FIG. 1, in a preferred embodiment, the attribute signal compression module includes: a sparse coefficient rearrangement submodule, a uniform quantization submodule, a differential encoding prediction submodule, and an adaptive arithmetic entropy encoding submodule.

The sparse coefficient rearrangement submodule is connected to the uniform quantization submodule to transmit non-zero coefficients and indices of the rearranged sparse coefficient matrix. The uniform quantization submodule is connected to the differential encoding prediction submodule to transmit quantized sparse coefficients. The differential encoding prediction submodule is connected to the adaptive arithmetic entropy encoding submodule to transmit a differential encoding residual of the coefficient indices and the quantized values of the sparse coefficients. The adaptive arithmetic entropy encoding submodule is connected to the attribute signal decoding module to transmit the entropy encoded bit stream of the attribute signals.

Specifically, the sparse coefficient rearrangement submodule is configured to rearrange row vectors of the sparse coefficient matrix according to a descending order of the number of non-zero elements, and accordingly rearrange column atom vectors of the multi-scale dictionary, so as to reduce the entropy of the indices for subsequent differential encoding and effectively improve the compression ratio with the reconstructed signals unchanged.

Specifically, the uniform quantization submodule is configured to quantize the sparse coefficient matrix A into a matrix $A_q$ of integer values, and uses a dead-zone uniform quantizer to set a zero interval with a size twice of those of other uniform quantization intervals, so as to eliminate insignificant sparse coefficients with less information, thereby significantly improving the compression efficiency.

Specifically, the differential encoding prediction submodule is configured to perform differential encoding on the indices of the sparse coefficient matrix by columns, and mark the end of each column as zero, thereby further reducing information redundancy.

Specifically, the above-mentioned adaptive arithmetic entropy encoding submodule is configured to perform effective entropy encoding on the quantized non-zero coefficients and the differential prediction residual of the indices to obtain a complete compressed bit stream of the point cloud attribute signals.

As shown in FIG. 1, in a preferred embodiment, the attribute signal decoding module includes: an adaptive arithmetic entropy decoding submodule, a differential decoding prediction submodule, a dequantization submodule, and an attribute signal reconstruction submodule. The adaptive arithmetic entropy decoding submodule is connected to the differential decoding prediction module to transmit decoded sparse coefficients and differential prediction residual of the indices. The differential decoding prediction submodule is connected to the dequantization submodule to transmit the decoded indices of the sparse coefficients. The dequantization submodule is connected to the attribute signal reconstruction submodule to transmit dequantized sparse coefficients and decoded coefficient indices. The attribute signal reconstruction submodule is connected to the 3D point cloud reconstruction module to transmit the reconstructed point cloud attribute signals.

Specifically, the adaptive arithmetic entropy decoding submodule is configured to perform entropy decoding on the compressed bit stream to obtain the decompressed sparse coefficients and differential prediction residual of the indices Specifically, the differential decoding prediction submodule is configured to decode the residual of the indices to obtain the indices of the sparse coefficients.

Specifically, the above-mentioned dequantization submodule is configured to perform dequantization on the values $A_q$ of the sparse coefficients to restore the values of the sparse coefficients, and combine the sparse coefficients with the indices of the sparse coefficients to obtain a complete sparse coefficient matrix A.

Specifically, the attribute signal reconstruction submodule is configured to multiply the obtained reconstructed sparse coefficient matrix and the multi-scale dictionary X=DA to obtain reconstructed point cloud attribute signals.

The compression framework in the above-mentioned preferred embodiment of the present disclosure can perform customized quantization, prediction and entropy encoding on hierarchical sparse coefficients to further improve the performance of compression.

As shown in FIG. 1, a 3D point cloud reconstruction module is configured to synthesize complete point data from the decoded geometric information and attribute signals, and obtain the final reconstructed 3D point cloud data.

Parts of the present disclosure not specifically described in the above embodiments may be implemented using conventional techniques.

On the basis of the 3D point cloud compression system of the above embodiments, the following description is given in conjunction with specific application embodiments:

In this embodiment, the key parameters are set as follows: according to the general test conditions of MPEG PCC point cloud compression, the test point cloud data used in the experiment includes 5 point cloud data with a geometric resolution of 512×512×512 and 8 point cloud data with a geometric resolution of 1024×1024×1024, including multiple types of data, such as half-body and whole-body human body targets, building surfaces, cultural relics and natural scenes. The training data is obtained from a large number of data sets, and is partitioned into two types of data: "static target & scene" and "human body" according to the data content, and a multi-scale dictionary is trained for each type of data. The training data does not overlap with the test data. Since the human eye is more sensitive to changes in the luminance information of images, the original point cloud is converted from the RGB color space to the YUV color space. The resolution of each block of voxels is set as m×m×m=8×8×8, and the number of signal scales is set as K=2, i.e., the multi-scale training contains signals of two different scales: 8×8×8 and 4×4×4. Accordingly, the number of scales of the multi-scale dictionary is 2, and the two scales correspond to 512 and 64 dictionary atoms, respectively, and the dictionary matrix after zero-filling contains p=512+64× $2^3$=1024 dictionary atoms. The value space of the grouping weight parameter $w_g$ is $\{2^{-2}, 2^{-1}, 2^0, 2^1, 2^2\}^k$, where k=1,2 represents the scale of an atom. The value space of a regularization parameter $\lambda$ and a penalty parameter p is $\{10^{-2}, 10^{-1}, 10^0, 10^1, 10^2\}$. Experiments selected the best parameter combination through the grid search method. The dictionary is initialized as the DCT basis. The dictionary learning algorithm performs 20 epochs on the training data set, each epoch including 1000 iterations of the alternating direction method of multipliers and 10 Gauss-Seidel iterations.

The system compresses test point cloud data according to the above-mentioned embodiments of the present disclosure, and calculates the average BD-PSNR and BD-Rate as measures of compression performance. A larger BD-PSNR represents a better reconstruction quality of a compression system, and a smaller BD-Rate represents a higher code rate saving of the compression system.

Compared with the method proposed by C. Zhang (ICIP2014), the system of the present embodiment obtains an average BD-PSNR gain of 2.34 dB and an average BD-Rate of −49.14% over all test data, indicating a bit rate saving of 49.14% in the present method. Compared with the method proposed by R. L. de Queiroz (TIP2016), the system in the embodiment obtains an average BD-PSNR gain of 2.14 dB and an average BD-Rate of −52.55% over all test data, indicating a 52.55% bit rate saving in the method. Compared with the benchmark test model of MPEG 3DG international point cloud compression standards, the system of the present embodiment obtains an average BD-PSNR gain of 2.64 dB and an average BD-Rate of −15.37% over all test data, indicating a bit rate saving of 15.37% in the present method. Compared with the MPEG 3DG international point cloud compression standards G-PCC, the system of the present embodiment obtains an average BD-PSNR gain of 0.22 dB and an average BD-Rate of −0.22% over all test data, indicating a bit rate saving of 0.22% in the present method. Compared with the MPEG 3DG international point cloud compression standards V-PCC, the system of the present embodiment obtains an average BD-PSNR gain of 0.55 dB and an average BD-Rate of −4.16% over all test data, indicating a bit rate saving of 4.16% in the present method.

Experiments show that the compression efficiency of the above-mentioned embodiment system of the present disclosure is significantly superior to the method proposed by C. Zhang and R. L. de Queiroz, and the system of the present disclosure can significantly improve the reconstruction performance and save the encoding bit rate as compared with the international point cloud compression standards.

Specific embodiments of the disclosure have been described above. It is to be understood that the present disclosure is not limited to the specific embodiments described above, and that various changes and modifications within the scope of the claims may be made by those skilled in the art without affecting the spirit of the present disclosure.

What is claimed is:

1. A three-dimensional (3D) point cloud compression system based on multi-scale structured dictionary learning, comprising: a point cloud data partition module, a geometric information encoding module, a geometric information decoding module, an attribute signal encoding module, an attribute signal compression module, an attribute signal decoding module, and a 3D point cloud reconstruction module, wherein:

the point cloud data partition module is configured to partition original point cloud data into a voxel set with uniform spatial distribution and further partition the voxel set into blocks of point cloud voxels of different scales, transmit the obtained voxel set to the geometric information encoding module, transmit the blocks of point cloud voxels to the attribute signal encoding module, and form a training set and a test set using the blocks of point cloud voxels;

the geometric information encoding module is configured to perform lossless encoding on geometric position information of a point cloud voxel according to an octree structure, and transmit an encoded bit stream to the geometric information decoding module;

the geometric information decoding module is configured to decode the encoded bit stream to obtain decoded geometric information, and transmit the decoded geometric information to the attribute signal encoding module and the 3D point cloud reconstruction module;

the attribute signal encoding module is configured to learn a multi-scale structured dictionary from the blocks of point cloud voxels in the training set, perform hierarchical sparse coding on the blocks of point cloud voxels in the test set based on the multi-scale structured dictionary, transmit the multi-scale structured dictionary to the attribute signal compression module and the attribute signal decoding module, and transmit sparse coefficients of the hierarchical sparse coding to the attribute signal compression module;

the attribute signal compression module is configured to perform rearrangement, quantization, prediction and entropy encoding on the sparse coefficients, and transmit an encoded bit stream to the attribute signal decoding module;

the attribute signal decoding module is configured to perform entropy decoding, inverse prediction and dequantization to obtain a decoded sparse coefficient matrix, reconstruct point cloud attribute signals according to the multi-scale structured dictionary, and transmit the reconstructed attribute signals to the 3D point cloud reconstruction module;

the 3D point cloud reconstruction module is configured to integrate the geometric information obtained by the geometric information decoding module and the attribute signals obtained by the attribute signal decoding module to obtain a reconstructed 3D point cloud.

2. The 3D point cloud compression system according to claim 1, wherein the point cloud data partition module comprises: a voxel partition submodule and a block partition submodule, wherein:

the voxel partition submodule is configured to recursively partition a bounding cube where the original unorganized point cloud data is located into spatial coordinate systems-aligned and uniformly distributed voxel units, and transmit a voxel set obtained by voxel partition to the geometric information encoding module and the block partition submodule;

the block partition submodule is configured to uniformly partition the voxel set into blocks of voxels of different scales, and transmit a set of blocks of voxels to the attribute signal encoding module.

3. The 3D point cloud compression system according to claim 2, wherein the voxel partition submodule is configured to recursively partition the bounding cube of the point cloud into voxel units according to an octree structure, wherein each node of the octree containing point cloud point data is represented as a voxel unit, floating-point coordinates of points contained in each voxel unit are quantized into integer coordinates of a voxel center, and an average value of attribute information of the contained points is taken as an attribute signal of the voxel unit.

4. The 3D point cloud compression system according to claim 2, wherein the block partition submodule is configured to, according to a preset number of scales K, uniformly partition a set of N×N×N voxel units into blocks of voxels with a scale of m×m×m (m<N), and further decrease the scale layer by layer to partition the $$\frac{m}{2^{k-1}} \times \frac{m}{2^{k-1}} \times \frac{m}{2^{k-1}},$$

set of voxel units into blocks of voxels with a scale of k=1, . . . , K, all the obtained blocks of voxels constituting a set of multi-scale blocks of voxels.

5. The 3D point cloud compression system according to claim 3, wherein the geometric information encoding module is configured to allocate an eight-bit byte to each branch node in the octree structure of voxel partition to indicate whether point cloud point data exists in a spatial unit corresponding to child nodes of the branch node, traverse the octree structure in a depth-breadth first order to form an encoded codeword of geometric information composed of all the obtained bytes, further compress the information using entropy encoding to obtain an encoded bit stream of geometric information, and transmit the encoded bit stream of geometric information to the geometric information decoding module.

6. The 3D point cloud compression system according to claim 5, wherein the geometric information decoding module is configured to perform entropy decoding on the encoded bit stream of geometric information to obtain the octree structure for encoding and the byte of each branch node, obtain geometric coordinate information of each voxel unit, and transmit the decoded geometric coordinate information to the attribute signal encoding module and the 3D point cloud reconstruction module.

7. The 3D point cloud compression system according to claim 1, wherein the attribute signal encoding module comprises: a multi-scale dictionary learning submodule and a hierarchical sparse coding submodule, wherein:

the multi-scale dictionary learning submodule is configured to introduce a weight matrix to depict dimensional irregularity of the attribute signals of the blocks of voxels of different scales in the training set, and adaptively learn a multi-scale structured dictionary using an alternative optimization algorithm;

the hierarchical sparse coding submodule is configured to perform transform encoding on the attribute signals of the multi-scale blocks of voxels in the test set based on hierarchical sparsity of point cloud signals according to the learned multi-scale structured dictionary, and transmit sparse coefficients to the attribute signal compression module.

8. The 3D point cloud compression system according to claim 7, wherein the multi-scale dictionary learning submodule is configured to introduce a non-uniform weight matrix to depict dimensional irregularity of the attribute signals of the blocks of voxels, establish a minimization problem in which an optimization objective function is non-uniformly weighted mixed $\ell_1/\ell_2$ norm regularization, and alternately update dictionary atoms and sparse coefficients using Gauss-Seidel iterations to improve convergence speed of learning without enlarging an approximation error, wherein the learned dictionary atoms are naturally arranged in a tree structure, and as the scale of the atoms decreases from coarse to fine layer by layer, a signal frequency characterized by the atoms increases.

9. The 3D point cloud compression system according to claim 7, wherein the hierarchical sparse coding submodule is configured to design regularization terms of hierarchical sparsity constraints based on natural hierarchical structured priors of point cloud signals, and perform effective sparse coding on the attribute signals of the blocks of voxels in the test set based on the multi-scale structured dictionary using an alternating direction method of multipliers.

10. The 3D point cloud compression system according to claim 1, wherein the attribute signal compression module comprises: a sparse coefficient rearrangement submodule, a uniform quantization submodule, a differential encoding prediction submodule, and an adaptive arithmetic entropy encoding submodule, wherein:

the sparse coefficient rearrangement submodule is configured to rearrange the sparse coefficient matrix to improve a compression ratio of subsequent encoding, and transmit rearranged sparse coefficients to the uniform quantization submodule;

the uniform quantization submodule is configured to quantize the values of the sparse coefficients, and the differential encoding prediction submodule is configured to perform differential encoding on indices of the sparse coefficients;

the adaptive arithmetic entropy encoding submodule is configured to perform entropy encoding on the quantized sparse coefficients and the predicted indices, and transmit a compressed bit stream to the attribute signal decoding module.

11. The 3D point cloud compression system according to claim 10, wherein the sparse coefficient rearrangement submodule is configured to rearrange row vectors of the sparse coefficient matrix according to a descending order of the number of non-zero elements, and accordingly rearrange column atom vectors of the multi-scale dictionary, so as to reduce the entropy of the indices for subsequent differential encoding with the reconstructed signals unchanged.

12. The 3D point cloud compression system according to claim 10, wherein the uniform quantization submodule is configured to use a dead-zone uniform quantizer to set a zero interval with a size twice of those of other uniform quantization intervals, so as to eliminate insignificant sparse coefficients with less information.

13. The 3D point cloud compression system according to claim 10, wherein the differential encoding prediction submodule is configured to perform differential encoding on the indices of the sparse coefficient matrix by columns, and mark the end of each column as zero, thereby further reducing information redundancy.

14. The 3D point cloud compression system according to claim 10, wherein the adaptive arithmetic entropy encoding submodule is configured to perform effective entropy encoding on the quantized non-zero coefficients and differential prediction residual of the indices to obtain a complete compressed bit stream of the point cloud attribute signals.

15. The 3D point cloud compression system according to claim 1, wherein the attribute signal decoding module comprises: an adaptive arithmetic entropy decoding submodule, a differential decoding prediction submodule, a dequantization submodule, and an attribute signal reconstruction submodule, wherein:

the adaptive arithmetic entropy decoding submodule is configured to perform entropy decoding on the compressed bit stream to obtain decompressed sparse coefficients and differential prediction residual of the indices, and transmit the sparse coefficients and the differential prediction residual of the indices to the differential decoding prediction submodule;

the differential decoding prediction submodule is configured to decode the residual of the indices to obtain the indices of the sparse coefficients, and transmit the indices to the dequantization submodule;

the dequantization submodule is configured to dequantize the decompressed sparse coefficients to restore the values of the sparse coefficients, combine the sparse coefficients with the indices of the sparse coefficients to obtain a complete sparse coefficient matrix, and transmit the sparse coefficient matrix to the attribute signal reconstruction submodule;

the attribute signal reconstruction submodule is configured to multiply the obtained reconstructed sparse coefficient matrix and the multi-scale dictionary to obtain reconstructed point cloud attribute signals, and transmit the point cloud attribute signals to the 3D point cloud reconstruction module.

16. The 3D point cloud compression system according to claim 1, wherein the 3D point cloud reconstruction module is configured to synthesize complete point data from the decoded geometric information and attribute signals, and obtain the final reconstructed 3D point cloud data.

* * * * *